June 23, 1936.  J. P. LEINDORF  2,045,395
EXTENSIBLE AND CONTRACTIBLE PERCH
Filed Aug. 2, 1935
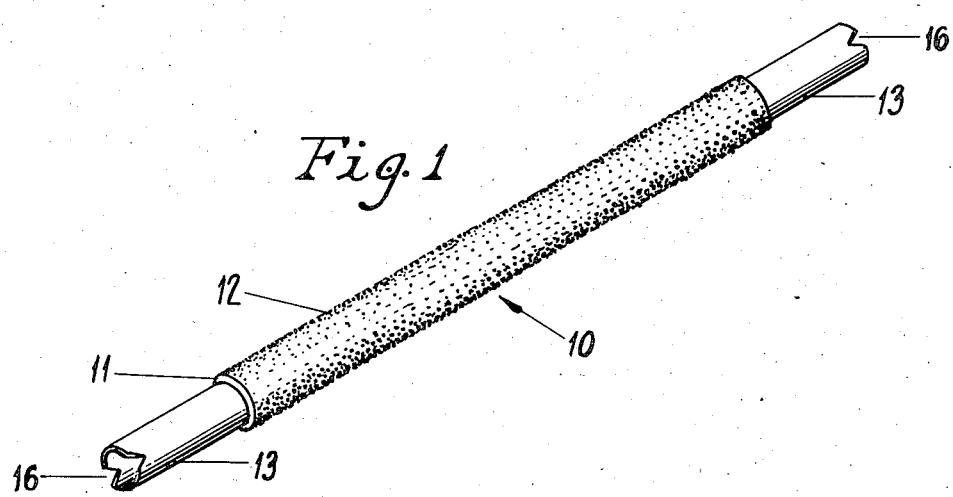
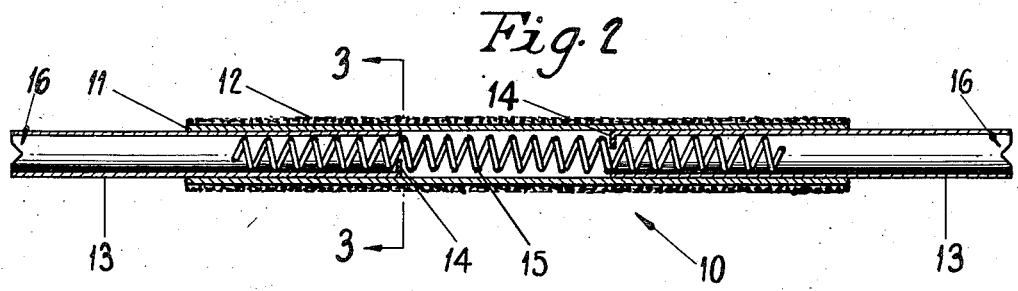
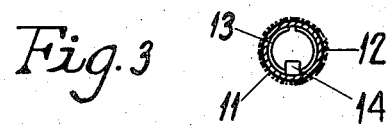
JOSEPH P. LEINDORF
INVENTOR.
BY Joseph Blacker
ATTORNEY Patented June 23, 1936

2,045,395

UNITED STATES PATENT OFFICE 2,045,395

EXTENSIBLE AND CONTRACTIBLE PERCH

Joseph P. Leindorf, Pelham Manor, N. Y.

Application August 2, 1935, Serial No. 34,363

1 Claim. (Cl. 119—26)

This invention relates to composite tubular perches for bird cages designed to permit adjustment and variation of the overall length of a perch when detached from the cage.

An object of this invention is to provide an extensible and contractible perch for bird cages which may be readily removed from the cage for cleaning and is adaptable for use in cages of various sizes.

Another object of this invention is to provide a perch which may be threadably varied in length and then attached to two upright wires on opposite sides of a cage and held in frictional engagement at any desired height of the upright wires in said cage.

With the above and other objects in view, the invention will be hereinafter more particularly described, and the combination and arrangement of parts will be shown in the accompanying drawing and pointed out in the claim which forms part of this specification.

Reference will now be had to the drawing, wherein like numerals of reference designate corresponding parts throughout the several views, in which:

Figure 1 is a perspective view of my novel tubular perch for bird cages.

Figure 2 is a longitudinal cross-section of the tubular perch shown in Figure 1.

Figure 3 is a transverse cross-section, the section being taken as on line 3—3 in Figure 2.

In the illustrated embodiment of the invention, Figures 1 and 2 show a composite perch 10, comprising a tube 11 preferably made of compressed paper and having an outer abrasive coating 12 preferably of gravel, sand or emery held together by a binding material such as glue. At each end of the tube 11 there is inserted one of the tubular supporting members 13 which are held in spaced relation by means of radial extensions 14 preferably integral with the members 13 and designed for threaded engagement with the coils of a resilient member or open coil compression spring 15.

The tubular supporting members 13 fit closely into the tube 11 but are slidable therein. One of the outer ends of each of these tubular supporting members 13 is provided with notches 16 extending transversely across the ends.

In applying the perch 10 to a bird cage, the notches 16 serve to receive wires at opposite sides of the cage. When removed from the cage, the tubular supporting members may be rotated about the coils of the spring 15 and the said members can then be moved inwardly or outwardly from the outer tube 11 and thus vary the overall length of the composite perch 10 and adapt this perch to bird cages of varying sizes.

When the perch is applied in operative position in a cage, the spring 15 is slightly compressed and the pressure or reaction of the spring against the tubular supporting members 13 is transmitted to the wires of the cage upon which the notched ends are positioned and serve to frictionally grip the wires and prevent rotation of the supporting members or any movement of the perch upon the wires of the cage.

As most bird cages are provided with one or more horizontal cross wires or rails to hold the vertical wires in proper position, it is advisable to adjust the perch so that the notched ends of the tubular supporting members 13 rest upon these cross wires with the notches 16 in engagement with or receiving opposite vertical wires.

My novel composite tubular perch may be readily positioned in operative relation in the bird cage and, if desired, easily removed for cleaning. When the paper tube 11 becomes worn or is rendered unserviceable from any other causes, it may be replaced without altering or discarding the tubular supporting members and the spring.

The invention herein described represents what I now consider the best embodiment thereof but the specific details set forth should be construed as illustrative and not by way of limitation as modifications may be effected therein without departing from the spirit of this invention as defined by the appended claim.

I claim:

In a threadably adjustable composite perch for bird cages, an outer tubular member, a tubular supporting member closely fitting into an end of said outer tubular member and slidable therein, another tubular supporting member closely fitting into the other end of said outer tubular member and slidable therein, and an open coil compression spring within said outer tubular member and extending within each of said tubular supporting members, the inner ends of each of said supporting members having transversely extending means designed for interlocking threaded engagement with the coils of said spring while permitting relative rotation between the inner tubular members and the spring coil to vary the overall length of said assembled perch when detached from the cage, the said supporting members having their outer ends notched for engaging the wires of the cage and being non-rotatably positioned to receive pressure directed outwardly upon their inner ends from said coil spring when mounted in the cage, the endwise pressure being substantially of the same intensity in all adjusted longitudinal positions.

JOSEPH P. LEINDORF.